Patented Sept. 29, 1931

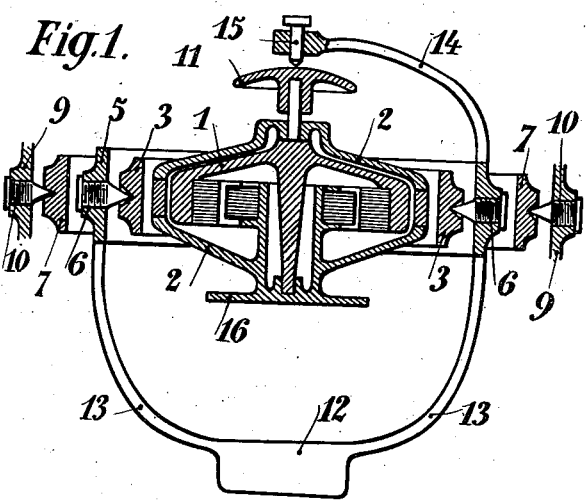
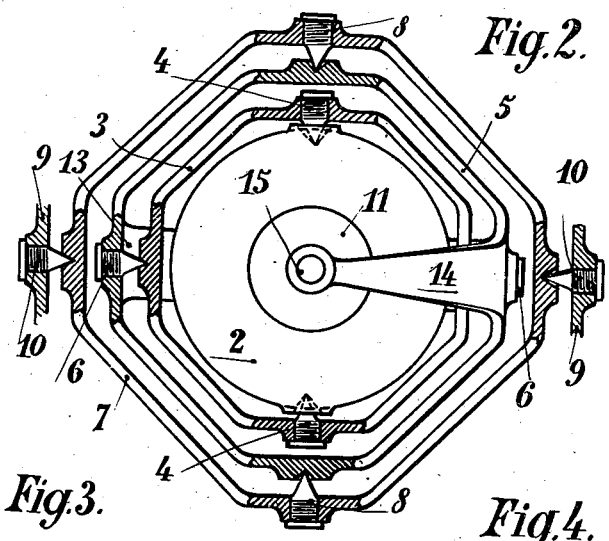
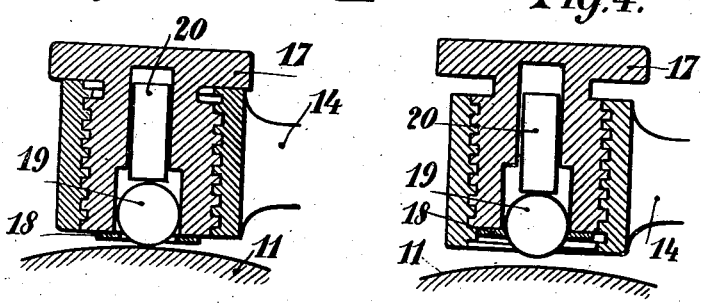

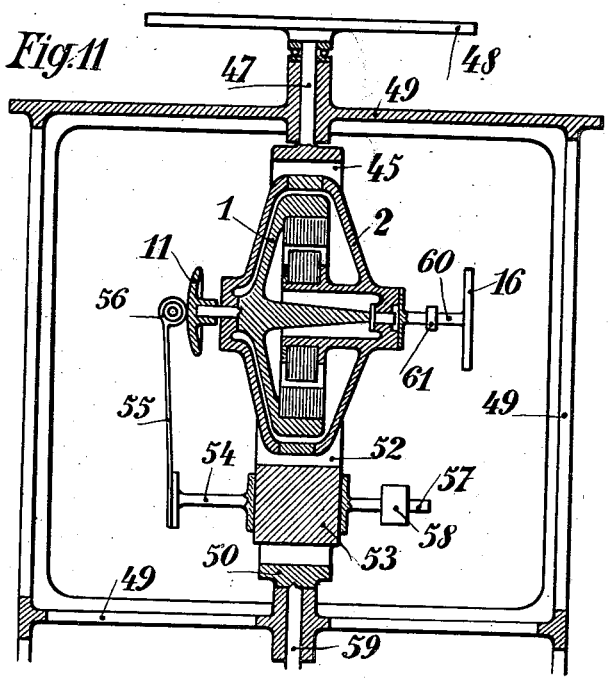
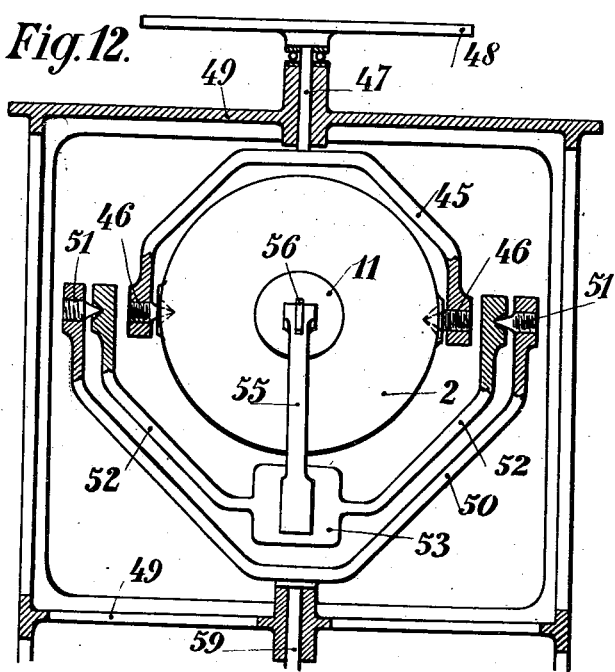

1,825,345

UNITED STATES PATENT OFFICE

JEAN FIEUX, OF PARIS, FRANCE, ASSIGNOR TO SCHNEIDER & CIE., OF PARIS, FRANCE, A LIMITED JOINT STOCK COMPANY

COMPENSATED GYROSCOPIC DEVICE FOR THE DETERMINATION OF PLANES OR DIRECTIONS OF REFERENCE

Application filed November 14, 1927, Serial No. 233,268, and in France December 22, 1926.

The present invention relates to a device adapted to enable the gyroscopes employed as inclination or orientation references on board ships, aeroplanes, airships or other oscillating bodies to be returned and maintained in a position near the theoretical reference position.

It is known that these gyroscopes are characterized by the fact that their suspensions comprise a number of degrees of freedom sufficient to permit the axis of rotation of the rotating mass or rotor to preserve a practically fixed direction in space, whatever be the angular displacement of the support.

It is also known that in order to answer the current needs of navigation and firing control on board ships, the axis of such a gyroscope must follow the diurnal movement of rotation of the earth because it must preserve a determined position relative to the earth. It is for this reason that it is necessary to make this axis follow the vertical at the place, when it is desired to obtain a horizontal plane of reference, and a horizontal line preferably directed along the meridian of the plane when it is desired to obtain a vertical plane of reference.

The means currently employed for compelling the axis of the gyroscope to follow the diurnal movement consist in suspending the stabilized element after the manner of a pendulum, the centre of gravity of the rotor and of its casing being situated at a certain distance from the centre of suspension. The gyroscopic system is thus subjected to a returning couple in the field of gravity which tends to make it move angularly with the movement of rotation of the earth.

But such a gyroscopic arrangement is also subjected to disturbing couples due to the accelerations of its support. The movements of precession which result therefrom are difficult to damp out, and frequently make the reference indications too uncertain, the latter lacking at the same time in accuracy and fixity.

The means forming the subject of the present invention relate to a pendulum compensating device which presents the advantage of avoiding almost completely the precessions due to the accelerations of the support and of damping in a rational manner the accidental movements of the gyroscope about the theoretical position of reference. The invention is essentially characterized by the use of a friction device establishing a controlling connection between the gyroscope acting as reference member and a pendulum acting as compensating member, the gyroscope and the pendulum having practically the same centre of suspension, but each having its own suspension.

The friction device comprises preferably a friction member exerting a certain pressure upon the spherical surface of a member maintained in a movement of rotation, these two members being carried respectively one by the gyroscope, the other by the pendulum or vice versa. The movement of the rotating member takes place in the same direction as that of the gyroscope rotor, when this member is carried by the gyroscope, and in the opposite direction when it is carried by the pendulum. The centre of curvature of the friction surface practically coincides with the common centre of suspension.

With this device the accuracy of the compensating action increases in proportion as the contact between the two friction elements extends over a smaller surface. It may be compared to a great extent to the action causing spinning tops to rise, which action it is known is due to the friction of the point upon the ground. The position of the centre of friction relative to the axis of rotation of the rotating member determines rationally the direction of the compensating force and the pressure exerted by the friction member determines the intensity of this force. The later, upon which depends the angular correcting velocity, may be very small, if the compensation for the rotation of the earth is produced by a means independent of the friction device. The displacement of the gyroscope about the theoretical position of reference can then only take place very slowly, a condition which is particularly favourable for firing control on board ships.

The invention comprises means for producing the momentary separation of the friction members and consequently for suspending, during prolonged accelerations, any compensating effect produced by the friction, in order to prevent the reference member making systematic deflections of too great an amplitude.

Various forms of construction and use of the invention are illustrated by way of example in the accompanying drawings.

Figs. 1 and 2 represent in sectional elevation and in plan respectively the application of the invention to a device determining a horizontal plane of reference, in which the rotating member is carried by the gyroscope. Figs. 3 and 4 illustrate in two different positions, a special ball friction member particularly adapted for use with the apparatus shown in Figs. 1 and 2; Figs. 5 and 6 illustrate in sectional elevation and plan respectively a device for determining a horizontal plane of reference in which the rotating member is carried by the pendulum; Figs. 7 and 8 represent in sectional elevation and plan respectively a device determining a horizontal plane of reference and comprising a means for compensation for the earth's rotation which is independent of the friction effect.

Figs. 11 and 12 illustrate in sectional elevation and external side view respectively a device determining a vertical plane of reference.

Figure 5:
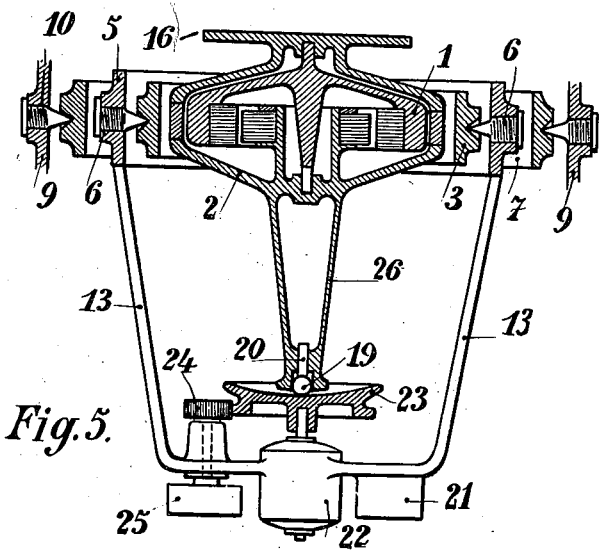

In the device shown in Figs. 1 and 2, 1 is the rotor of a gyroscope the movement of rotation of which around a practically vertical axis in the interior of a casing 2 is maintained electrically. This casing is suspended from a frame 3 by means of the trunnions 4, 4 situated upon an axis perpendicular to the axis of rotation of the rotor. The frame 3 is suspended from a frame 5 by means of trunnions 6, 6 situated upon an axis perpendicular to the axis of the trunnions 4, 4. The frame 5 is suspended from a frame 7 by means of trunnions 8, 8 situated upon an axis perpendicular to the axis of the trunnions 6, 6. Finally the frame 7 is suspended upon the supporting frame 9 by means of trunnions 10, 10 situated upon an axis perpendicular to the axis of the trunnions 8, 8.

According to the invention, the shaft of the rotor 1 is extended outside the casing 2 and carries a spherical cap 11 the centre of the free convex surface of which is practically the common point of intersection of the various axes mentioned above.

The frame 5 is made rigid with the pendulum 12 by arms 13, 13. It is also rigid with an arm 14 the end of which serves as guide for a friction pin 15 resting by its own weight upon the cap 11. This pin is guided with clearance along an axis which passes through the point of intersection of the suspension axes and through the centre of gravity of the compound pendulum comprising the frame 5 and the members rigid therewith.

The plane of reference which must be perpendicular to the axis of the rotor is formed by a table 16 rigid with the casing 2.

In the particular friction device shown in Figs. 3 and 4, the friction member comprises a ball 19 and a cylindrical mass 20 which are free to move along an axis passing through the centre of suspension and the centre of gravity of the pendular system, in a cavity of suitable shape formed in a guide 17. The latter is provided with an annular plate 18 the interior diameter of which is slightly smaller than the diameter of the ball.

The normal position of the members of the friction device is that shown in Fig. 3; but this guide 17 itself is adapted to move by a screwing movement in the arm 14, by an amount sufficient to make the plate 18 support the ball and the mass and, consequently, remove the contact between the ball and the cap 11, as shown in Fig. 4.

Figure 6:
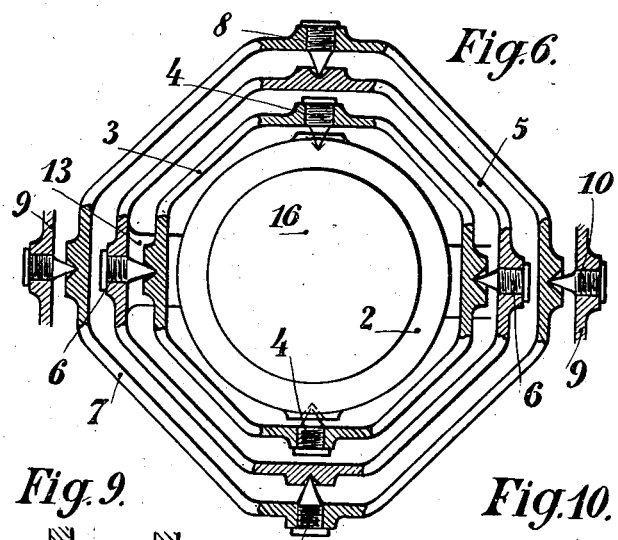
Figure 9:
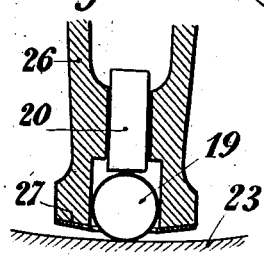
Figs. 9 and 10 illustrate, in two different positions, the ball friction member of the device shown in Figs. 7 and 8.

In the example shown in Figs. 5 and 6, the group of members 1, 2, 3, 4, 5, 6, 7, 8, 9 and 10 in Figs. 1 and 2 occurs again.

The casing 2 carries at its upper part the table 16 forming the plane of reference and at its lower part a tail 26 the end of which acts as a guide for the cylindrical mass 20 and for the ball 19, which are adapted to move along a line extending in alignment with the axis of the rotor 1.

The arms 13, 13 make the frame of an electric motor 22, a pendular mass 21 and the bearing of a rotating mass 25 rigid with the frame 5. The axis of rotation of the rotating mass 25 and the axis of the motor 22 are parallel with each other.

The ball 19 which supports the mass 20 rests upon the spherical surface of a cup 23 rigid with the shaft of the motor. This cup comprises a toothed circular crown engaging a pinion 24 rigid with the axis of the rotating mass 25.

The motor 22 turns in an opposite direction to the direction of rotation of the rotor 1. The gyroscopic effect of the cup and of the armature of the motor 22 will be compensated practically by the opposing gyroscopic action of the mass 25 and of the pinion 24.

The axis of rotation of the motor 22 must coincide practically with the line passing through the centre of gravity and the centre of suspension of the pendular system. Further, the centre of curvature of the concave surface of the cup must be as near as possible to the centre of suspension.

In the device shown in Figs. 7, 8, 9 and 10, the members 1, 2, 3, 4, 5, 6, 7, 16, 19, 20 and 26 in the device shown in Figs. 5 and 6 occur again. The tail 26 carries a supporting rod 34 for a cursor weight 35. The frame 7 is suspended from a ring mount 28 by means of trunnions 29, 29 situated upon an axis perpendicular to the axis of the trunnions 8, 8.

The ring mount, which is adapted to turn upon the supporting frame 30, comprises a set of teeth 31 engaging a pinion 32 rigid with a shaft 33. The latter will be actuated either by hand or by being placed under the control of the ship's compass, in such a way that the rod 34 will be maintained practically in the north-south direction. The cursor weight 35 must be moved into the position corresponding to the latitude of the place.

The arms 13, 13 are rigid with the frame 5 and constitute the frame of a motor 42, the winding of an electro-magnet 41, a pivot bossage 39, a double stop 40, and the bush of the spherical cup 36, the spindle 37 of which presses upon a lever 38 carrying the plunger element of the electro-magnet 41. The shaft of the electric motor which is parallel to the shaft 37 carries a hand wheel 44 and a pinion 43 engaging with the toothed crown carried by the cup 36. The electric motor turns in the same direction as the rotor of the gyroscope and makes the cup turn in the opposite direction. The gyroscopic action of the latter will be practically compensated by the opposing gyroscopic action of the hand wheel 44, of the pinion 43 and of the armature of the motor 42.

The axis of rotation of the cup must practically coincide with the line passing through the centre of gravity and the centre of suspension of the pendular system. Further, the centre of curvature of the spherical surface receiving the contact of the ball must also be as near as possible to this point of suspension.

Figure 10:
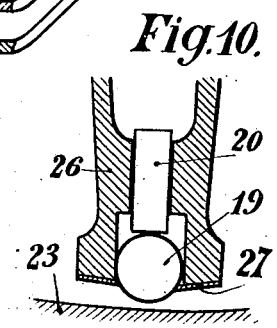
Figure 7:
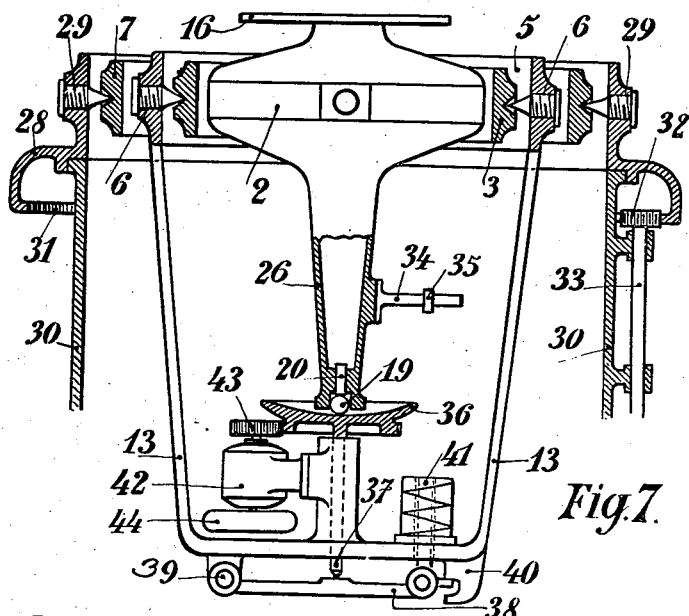
Figure 8:
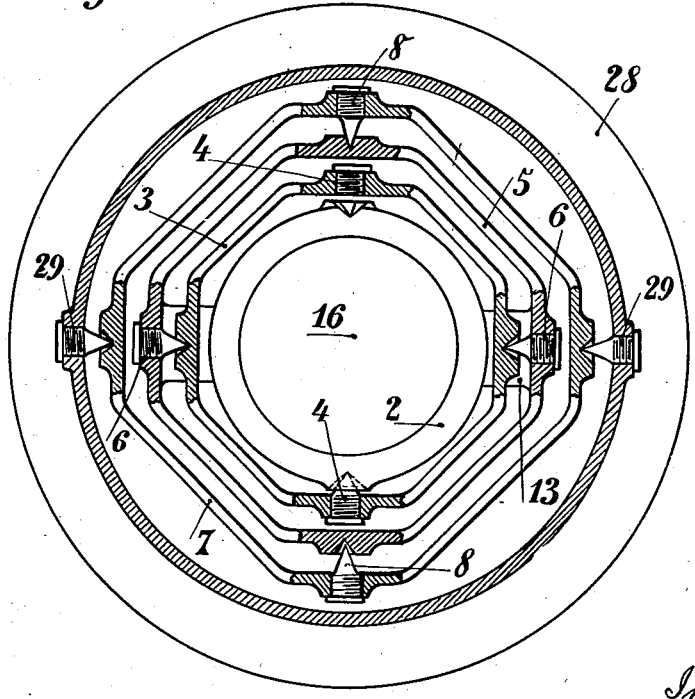

The ball 19 and the mass 20 are adapted to move along a line extending the axis of the gyroscope rotor, in a guide of suitable shape formed by the end of the tail 26. The latter comprises an annular plate 27 (Figs. 9 and 10) the internal diameter of which is slightly smaller than the diameter of the ball. The normal position is that shown in Fig. 9. But when the electro-magnet 41 is no longer excited, the cup 36 can move down at the same time as the lever 38 and lose contact with the ball, as shown in Fig. 10. The holding circuit of the electro-magnet may be broken, either automatically or by hand, to produce a separation of the friction members, in order to prevent systematic deflection of too large an amplitude.

In the example shown in Figs. 11 and 12 relating to an application of the invention to the determination of a vertical plane of reference, the rotor 1 is maintained electrically in a movement of rotation, around a practically horizontal axis, in the interior of its casing 2. This casing is suspended, by means of trunnions 46, 46 situated upon a practically horizontal axis perpendicular to the axis of rotation of the rotor, from a fork 45 rigid with a vertical spindle 47 perpendicular to the line joining the trunnions 46, 46. The spindle 47, which carries a compass rose 48, can turn very freely in the supporting frame 49.

A second fork 50, rigid with a spindle 59 placed in alignment with the spindle 47 and adapted to turn in the supporting frame 49, carries, through the medium of trunnions 51, 51, a pendular mass 53 rigid with the arms 52, 52. The line of the trunnions 51, 51 is perpendicular to the spindle 59 and situated on the level of the line joining the trunnions 46, 46.

The mass 53 is also rigid, on the one hand, with the rod 57 carrying an auxiliary adjusting mass 58, and on the other hand with a support 54 upon which is secured a flexible blade 55. This blade carries at its free end a roller 56 the plane of rotation of which passes through the spindle 59 and the axis of rotation of which is situated on the level of the lines joining the trunnions 46, 46 and 51, 51.

The elastic tension of the blade 55 keeps the roller 56 in contact with the spherical cap 11 carried by the shaft of the rotor and the free convex surface of which has practically as centre the point of intersection of the axis of the guiding spindle 47 with the line joining the trunnions 46, 46.

The casing 2 carries, through the medium of a rod 60, the disc 16 forming the plane of reference perpendicular to the axis of the rotor. The rod 60 carries a cursor weight 61, which must be brought into the position corresponding to the latitude of the place.

It is necessary to make the spindle 59 either by hand or automatically follow the rose 48 or the rose of a compass on board the ship so as to obtain in practice the coincidence of the lines joining the trunnions 46, 46 and 51, 51.

Claims:

1. Apparatus of the class described comprising a gyroscopic system mounted for universal movement, a compensating pendulum, means for mounting said pendulum for independent universal movement, and frictional connecting means operatively interposed between said system and pendulum, said connecting means being independent of said mounting means.

2. Apparatus of the class described comprising a gyroscopic system, a compensating pendulum therefor, means for mounting said pendulum for independent universal movement, and means operatively connecting said pendulum and system including frictional transmission means independent of said mounting means.

3. Apparatus of the class described comprising a gyroscopic system, a compensating pendulum therefor, means for mounting said system and pendulum for independent universal movement about a substantially common effective center, and frictional connecting means operatively interposed between said system and pendulum, said connecting means being independent of said mounting means.

4. Apparatus of the class described comprising gyroscopic means mounted for universal movement, compensating pendulum means mounted for independent universal movement, a friction surface operatively connected with one of said means, and a friction member operatively connected with the other of said means and having a single point contact with said surface.

5. Apparatus of the class described comprising a gyroscopic system mounted for universal movement, a compensating pendulum mounted for independent universal movement, and frictional connecting means operatively interposed between said system and pendulum including a curved friction surface and a friction contact member having a one-point engagement therewith.

6. Apparatus of the class described comprising a gyroscopic system mounted for universal movement, a compensating pendulum mounted for independent universal movement, and frictional connecting means operatively interposed between said system and pendulum including a spherical friction surface and a one-point contact member engaging therewith.

7. Apparatus of the class described comprising a gyroscopic system, a compensating pendulum therefor, means for mounting said system and pendulum for independent universal movement about a substantially common effective center, and frictional connecting means operatively interposed between said system and pendulum including a friction surface spherical about said center and a friction contact member engaging therewith, said connecting means being independent of said mounting means.

8. Apparatus of the class described comprising a gyroscopic system mounted for universal movement, a compensating pendulum, means for mounting said pendulum for independent universal movement, frictional connecting means operatively interposed between said pendulum and system including a spherical friction surface and a friction contact member engaging therewith, and means for rotating said surface, said connecting means being independent of said mounting means.

9. Apparatus of the class described comprising gyroscopic means mounted for universal movement, compensating pendulum means mounted for independent universal movement, a spherical friction surface operatively connected with one of said means, and a friction contact member operatively connected to move with said other means and having a one-point engagement with said surface.

10. Apparatus of the class described comprising gyroscopic means mounted for universal movement, compensating pendulum means mounted for independent universal movement, a spherical friction surface operatively connected with one of said means, means for rotating said friction surface, and a friction contact member operatively connected to move with said other means and having a one-point engagement with said surface.

11. Apparatus of the class described comprising gyroscopic means, compensating pendulum means therefor, means for mounting each of said means for independent universal movement about a substantially common effective center, a friction surface spherical about said center and operatively connected with one of said means, a friction contact member operatively connected to move with said other means in engagement with said surface, and means for rotating said surface, said friction surface and contact member being independent of said mounting means.

12. Apparatus of the class described comprising a gyroscopic system mounted for universal movement, a compensating pendulum mounted for independent universal movement, a spherical friction surface rotatively mounted on said pendulum, means for rotating said surface and a friction contact member operatively connected to move with said system in engagement with said surface.

13. Apparatus of the class described comprising a gyroscopic system, a compensating pendulum therefor, said system and pendulum being mounted for independent universal movement about a common effective center, a friction surface spherical about said center and rotatively mounted on said pendulum, means for rotating said surface, and a friction contact member operatively connected to move with said system in engagement with said surface.

14. Apparatus of the class described comprising a gyroscopic system mounted for universal movement, a compensating pendulum therefor mounted for independent universal movement, a spherical friction surface rotatively mounted on said pendulum, means for rotating said surface, a cooperating friction member operatively connected to move with said system in engagement with said surface, and means for relatively displacing said member and surface out of engagement with each other.

15. Apparatus of the class described comprising a gyroscopic system mounted for universal movement, a compensating pendulum therefor mounted for independent universal movement, a spherical friction surface rotatively mounted on said pendulum, means for rotating said surface, a cooperating friction member operatively connected to move with said system in engagement with said surface, and additional means compensating for diurnal movement of the earth.

16. In a friction device of the class described for transmitting the movement of one body to another relatively movable body, a spherical surface operatively connected with one of said bodies, means for rotating said surface, and a pressure member having a one-point bearing contact with said surface and operatively connected with the other of said bodies, the contact between said pressure member and said surface constituting the sole motion transmitting connection between said bodies.

17. In a friction device of the class described for transmitting the movement of one body to another relatively movable body, a spherical surface operatively connected with one of said bodies, means for rotating said surface, a ball carried loosely by the other of said bodies and bearing on said surface, and a pressure block bearing on said ball.

In testimony whereof I have signed this specification.

JEAN FIEUX.